United States Patent
Walsh et al.

(10) Patent No.: US 6,621,825 B1
(45) Date of Patent: Sep. 16, 2003

(54) METHOD AND APPARATUS FOR PER CONNECTION QUEUING OF MULTICAST TRANSMISSIONS

(75) Inventors: David Bernard Walsh, Ottawa (CA); Kirk Aaron Jong, Pasadena, CA (US)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/474,415

(22) Filed: Dec. 29, 1999

(51) Int. Cl.[7] .............................................. H04L 12/28
(52) U.S. Cl. ...................... 370/412; 370/413; 370/425
(58) Field of Search ................................ 370/412, 413, 370/425, 428, 389, 390, 395.1, 395.7, 395.71, 905, 400

(56) References Cited

U.S. PATENT DOCUMENTS 5,528,588 A * 6/1996 Bennet et al. ................ 370/60
5,963,553 A * 10/1999 Wicklund .................... 370/390

\* cited by examiner

*Primary Examiner*—Douglas Olms
*Assistant Examiner*—Robert W. Wilson

(57) ABSTRACT

A method and apparatus for per connection queuing of multicast transmissions. The method begins by receiving a cell associated with a multicast transmission. A multicast transmission typically includes a single ingress connection and a plurality of egress connections. The processing then continues by queuing the cell in a next available cell buffer of a root queue that is associated with the multicast transmission. Next, a determination is made as to whether a predetermined number of leaf queues (i.e., queues associated with egress queue identifiers) associated with the multicast transmission are empty when the queuing of the cell commences. Each of a plurality of leaf queues is associated with a corresponding one of the egress connections of the multicast transmission. A leaf queue will be empty when the corresponding egress connection has transported all of the data cells contained within the root queue associated with the multicast transmission. When the queuing of the cell commences, the identity of any empty leaf queues will be included in a segment queue. The processing continues by either appending the identities of the leaf queues in the segment queue to an update queue as a segment, or by updating the head pointers of the empty leaf queues (activating the empty leaf queues) while the cell is being received and enqueued in the root queue. The update queue then allows the empty leaf queues in the segment to be activated after the cell has been enqueued.

38 Claims, 13 Drawing Sheets

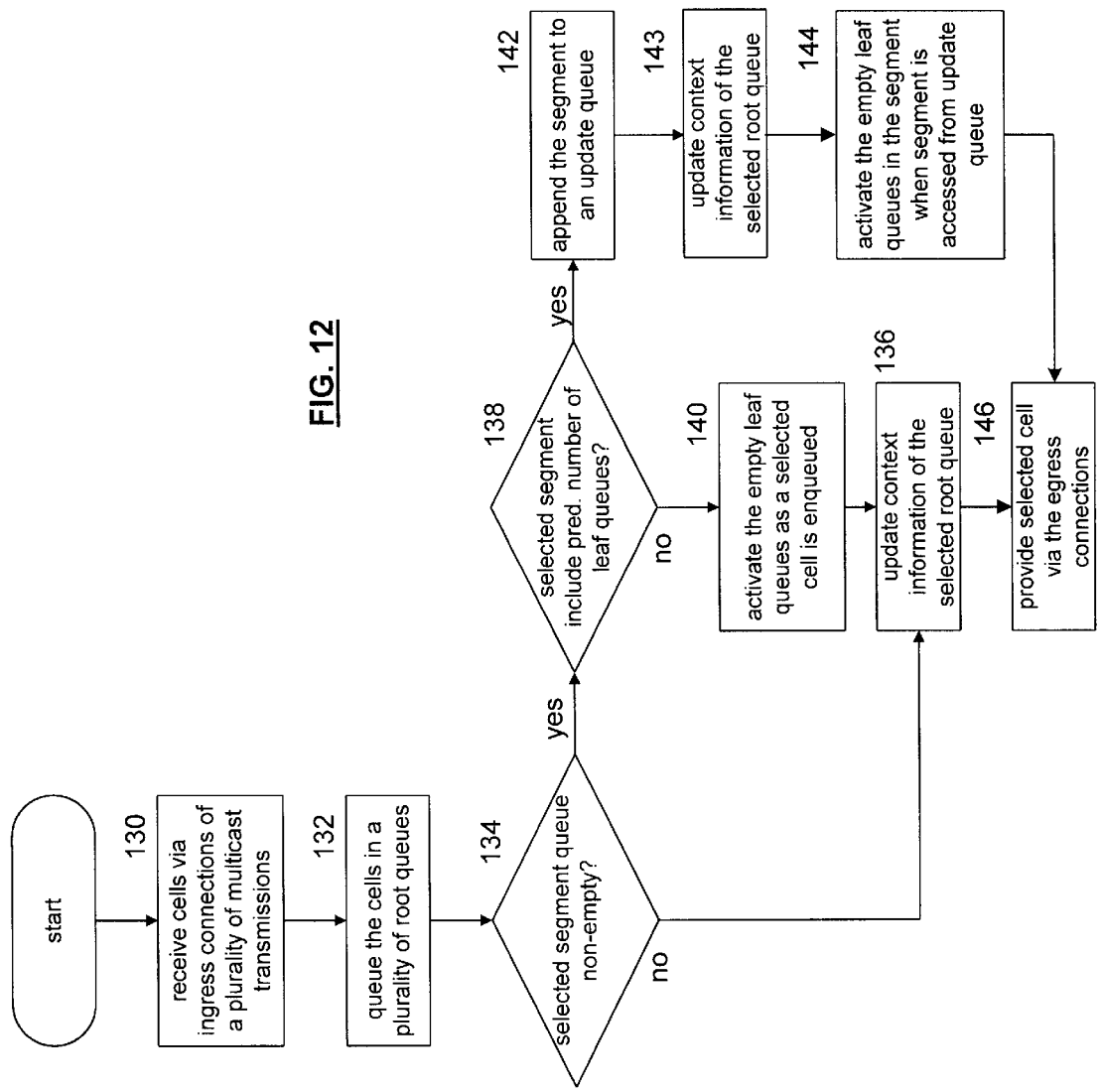

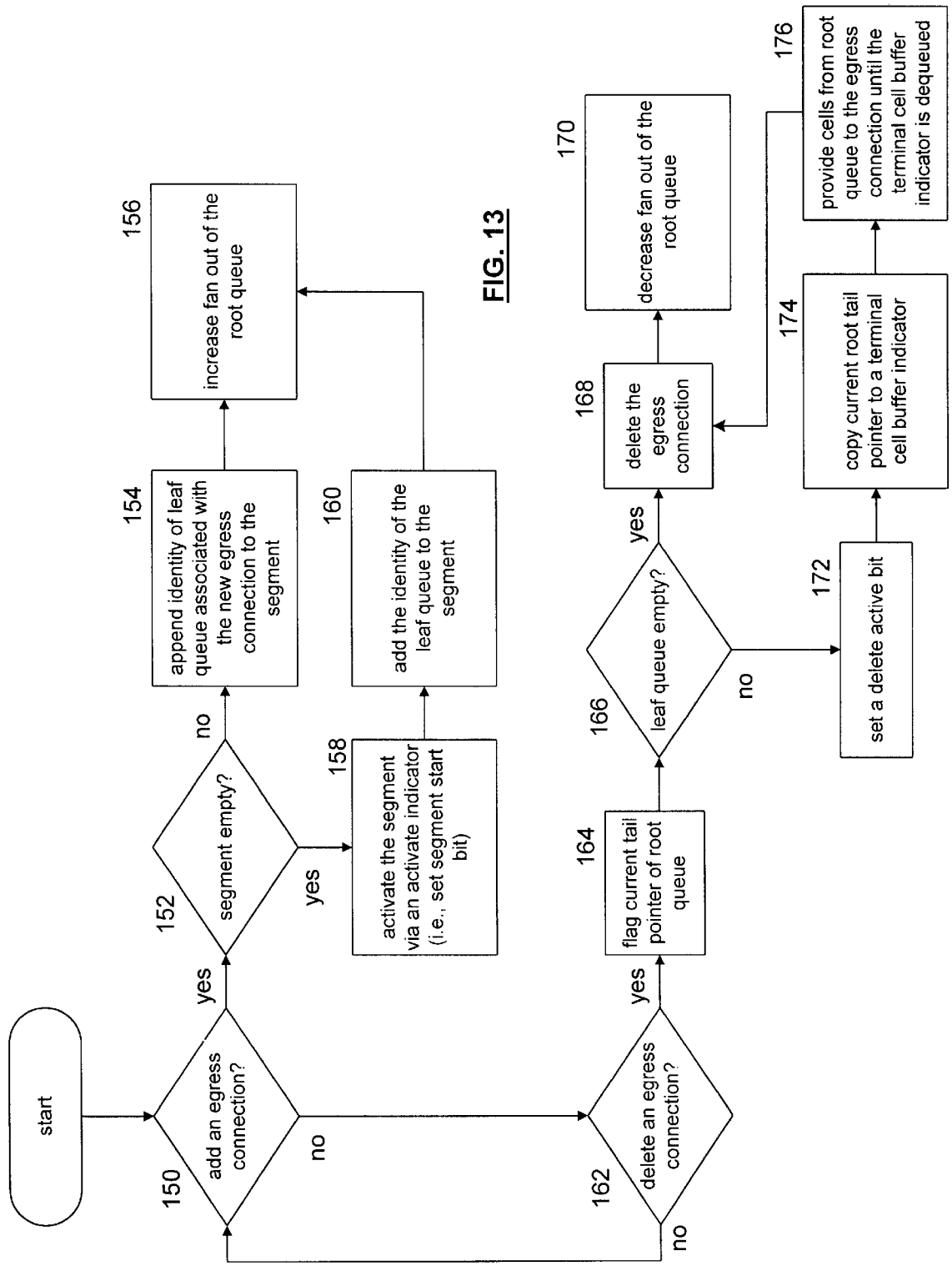

METHOD AND APPARATUS FOR PER CONNECTION QUEUING OF MULTICAST TRANSMISSIONS

TECHNICAL FIELD OF THE INVENTION

This invention relates generally to communication networks and more particularly to per connection queuing of multicast transmissions within such communication systems.

BACKGROUND OF THE INVENTION

Communication networks are known to include a plurality of switches that transport user data (e.g., voice, video, text, etc.) between calling parties and called parties. The user data may be transported using any one of a plurality of standardized data transport protocols. Such transport protocols include frame relay (FR), asynchronous transfer mode (ATM), internet protocol (IP), etc. In addition, the switches transport system data that contains information regarding the connections currently being supported by the network. For example, the system data may include multicast transmission information.

Multicast transmissions provide the same data to a plurality of destinations. To properly process multicast transmissions, a queuing scheme, such as that disclosed in U.S. Pat. No. 5,528,588 issued to Bennett (the "Bennett Patent"), may be employed. In general, the Bennett Patent teaches a linked list queuing scheme for spatial multicast transmissions in an ATM network. Spatial multicast transmissions provide data from an originating party to a plurality of destination parties via a plurality of physical paths (e.g., line cards, or a plurality of ports included in a line card). The linked list stores incoming cells of a connection that are read out for each port using separate read pointers. Once a cell has been provided to each port, it is removed from the linked list.

While the Bennett Patent teaches a linked list queuing scheme for ATM multicast transmissions, it does not address processing issues that arise due to data bursts that are typical in ATM networks. Such issues include updating read and stop pointers for each queue as new data bursts are received, processing logical multicast transmissions, and subsequent dequeue scheduling. If such issues are not properly addressed, data will be lost, corrupting the transmission.

Therefore, a need exists for a method and apparatus that processes multicast transmissions, updates queuing pointers for each destination, and ensures proper dequeuing of received data bursts.

BRIEF DESCRIPTION OF THE DRAWINGS

FIG. 12 illustrates a flow diagram of an alternate method for per connection queuing of multicast transmissions in accordance with the present invention; and FIG. 13 illustrates flow diagram of a method for adding or deleting an egress connection of a multicast transmission in accordance with the present invention.

DETAILED DESCRIPTION

Generally, the present invention provides a method and apparatus for per connection queuing of multicast transmissions. Such processing begins by receiving a cell associated with a multicast transmission. A multicast transmission typically includes a single ingress connection and a plurality of egress connections. The processing then continues by queuing the cell in a next available cell buffer of a root queue that is associated with the multicast transmission. Next, a determination is made as to whether a predetermined number of leaf queues (i.e., queues associated with egress queue identifiers) associated with the multicast transmission are empty when the queuing of the cell commences. Each of a plurality of leaf queues is associated with a corresponding one of the egress connections of the multicast transmission. A leaf queue will be empty when the corresponding egress connection has transported all of the data cells contained within the root queue associated with the multicast transmission. When the queuing of the cell commences, the identity of any empty leaf queues will be included in a segment queue. The processing continues by either appending the identities of the leaf queues in the segment queue to an update queue as a segment, or by updating the head pointers of the empty leaf queues (activating the empty leaf queues) while the cell is being received and enqueued in the root queue. The update queue then allows the empty leaf queues in the segment to be activated after the cell has been enqueued. With such a method and apparatus, logical multicast transmissions may be processed, the update queue can be updated during data bursts, and the dequeuing of cells from a root queue is performed without loss of data.

Figure 1:
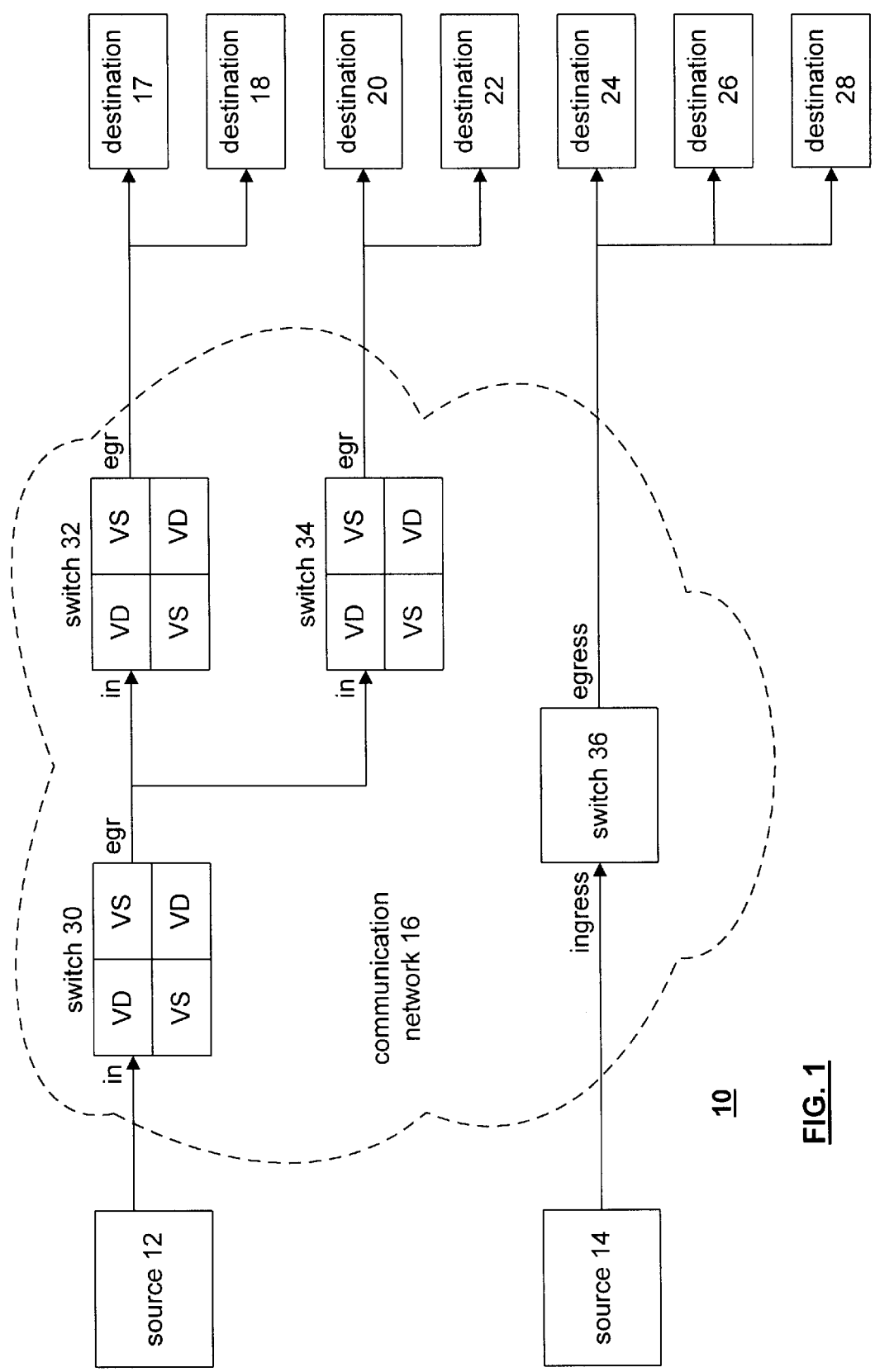
FIG. 1 illustrates a schematic block diagram of a communication system in accordance with the present invention.

The present invention can be more fully described with reference to FIGS. 1–13. FIG. 1 illustrates a schematic block diagram of a communication system 10 that includes a plurality of sources 12 and 14, a communication network 16, and a plurality of destinations 17–28. The sources 12 and 14 may be end user devices such as telephones, video conferencing equipment, personal computers, fax machines, and/or devices that transmit and receive information via the communication network 16. In other cases, the sources 12 and 14 may be end point switching equipment, such as a private branch exchange switch (PBX), a local switch, a server, etc. Similarly, the destinations 17–28 may be end user devices and/or end point switching equipment.

The communication network 16, which may include the public switch telephone network (PSTN), the internet, wireless communication systems, local area networks, and/or wide area networks, includes a plurality of switches 30–36. Switches 30–34 include virtual source/virtual destination functionality such that each of these switches may function as a source and/or destination. Such switches 30–34 may be similar to the 36170 switch manufactured by Newbridge Networks Corporation of Ottawa, Canada. Switch 36 may be a switching device that lacks virtual source/virtual destination functionality. The switches 30–36 may be found in ATM switching networks, frame relay switching networks, and/or internet protocol switching networks. Regardless of the type of switch 30–36, each of the switches includes a queue management module 40 (discussed below with reference to FIG. 2 through 13) for processing multicast transmissions on a per connection basis.

Multicast transmissions may be done spatially or logically. Spatial multicast transmissions provide data from an originating party to a plurality of destination parties via a plurality of physical paths (e.g., line cards). In such systems, one physical path (line card) is used for each destination party. Spatial multicast transmissions may also be provided by a single line card that includes a plurality of ports where each port is associated with a destination. Logical multicast transmissions provide the data from the originating party to the destination parties via a common physical path (a single port or line card) that transmits the same data at different times to the destination parties. Thus, a single port may support a plurality of virtual connections, where each of the plurality of virtual connections provides a path to a destination.

As is shown, source 12 is involved in a multicast transmission with destinations 17–22. The illustrative communication path includes switches 30–34. The source 12 provides cells to switch 30, which in turn provides cells to switches 32 and 34. With regard to the cell traffic illustrated, the switch 30 is considered to be downstream from the source 12 and upstream from the switches 32 and 34. Because the switch 30 delivers the cells to both of the switches 32 and 34, the virtual source of the switch 30 that communicates with the switches 32 and 34 processes cells as a multicast transmission.

The switch 32 and the switch 34 are operably coupled to destinations 17 and 18 and destinations 20 and 22, respectively. As such, each of the switches 32 and 34 function to provide the per connection queuing of the multicast transmission as it is delivered to each of the respective destinations 17–22.

The source 14 is operably coupled to the switch 36, and the switch 36 is operably coupled to destinations 24–28. Therefore, the switch 36 processes the per connection queuing for the destinations 24–28. As one of average skill in the art appreciates, each of the switches 30–36 can support multiple communications, or virtual connections. For example, a switch may include one or more line cards, where a line card can support a plurality of connections. In addition, each of the line cards can support a plurality of destinations for a given multicast transmission.

Figure 2:
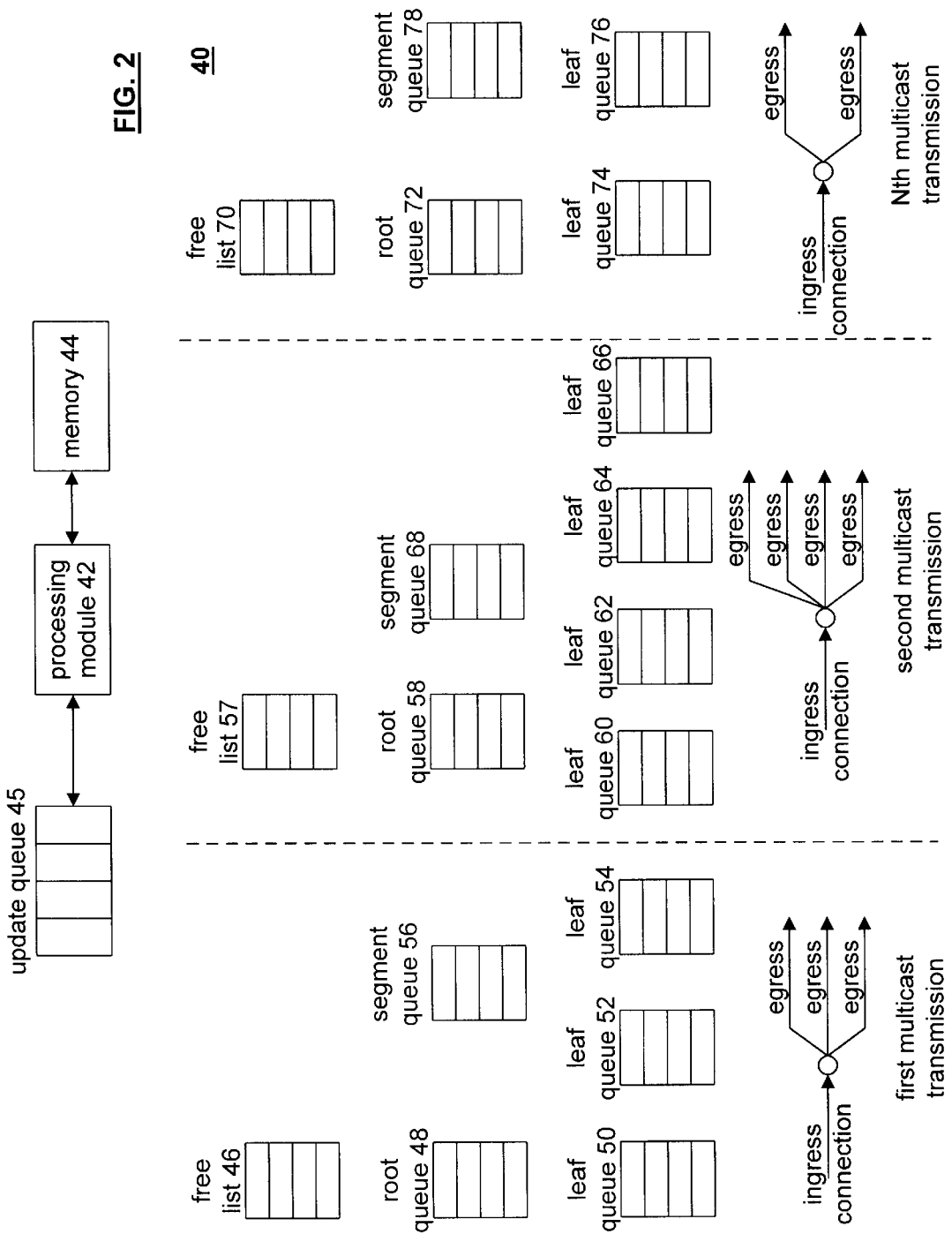
FIG. 2 illustrates a schematic block diagram of a queue management module in accordance with the present invention.

FIG. 2 illustrates a schematic block diagram of a queue management module 40. The queue management module 40 includes a processing module 42; memory 44; an update queue 45; a plurality of root queues 48, 58, and 72; a plurality of free lists 46, 57, and 70; a plurality of leaf queues 50, 52, 54, 60, 62, 64, 66, 74, and 76; and a plurality of segment queues 56, 68, and 78. The free lists, root queues, segment queues, update queue, and leaf queues may be in separate memory devices, they may be grouped in one or more memory devices, or they may be included in the memory 44 if the memory 44 allows for read and write memory accesses.

The processing module 42 may be a single processing entity or a plurality of processing entities. Such a processing entity may be a microprocessor, microcomputer, microcontroller, digital signal processor, central processing unit, state machine, logic circuitry, and/or any device that manipulates digital information based on operational instructions. The memory 44 may be a single memory device or a plurality of memory devices. Such a memory device may be a read only memory, random access memory, floppy disk memory, magnetic tape memory, hard drive memory, system memory, CD-ROM, DVD memory, and/or any device that stores digital information. If any of the queues or lists are to be included in the memory 44, the memory 44 is a memory structure that supports read and write operations, such as random access memory. Note that when the processing module 42 implements one or more of its functions via a state machine or logic circuitry, the memory containing the corresponding operational instructions is embedded in the circuitry of the state machine and/or the logic circuitry.

The memory 44 stores operational instructions that, when executed by the processing module 42, cause the processing module to perform the functions required to provide per connection queuing of multicast transmissions. The functions that are performed based on the operational instructions stored in memory 44 are discussed in greater detail below.

The queue management module 40 of FIG. 2 is shown to be currently supporting N multicast transmissions and includes a free list, a root queue, a segment queue, and a plurality of leaf queues for each of the multicast transmissions. As shown, the first multicast transmission includes a single ingress connection and three egress connections. Preferably, the multicast transmission is a logical multicast transmission such that the egress connections, which may be virtual connections, are maintained within a single port of a line card within the switch supporting the multicast transmission. In order to support the first multicast transmission, the queue management module 40 includes a root queue 48, a free list 46, a segment queue 56, and three leaf queues 50–54 that correspond to the three egress connections.

The root queue 48 stores incoming cells received via the ingress connection while the leaf queues 50–54 are utilized to identify the cells that are, or will be, copied from the root queue 48 and transported via each of the egress connections. In one example, the leaf queue 50 is associated with the top egress connection. As the top egress connection transports a cell from root queue 48, a head pointer within the leaf queue 50 is updated to point to the next cell in the root queue 48 to be transported. The same occurs for each of the other egress connections and their corresponding leaf queues.

The second multicast transmission includes a single ingress connection and four egress connections. As such, the queue management module 40 includes a free list 57, a root queue 58, four leaf queues 60–66, and a segment queue 68 in support of the second multicast transmission. The $N^{th}$ multicast transmission includes a single ingress connection and two egress connections. As such, the queue management module 40 includes a free list 70, a root queue 72, a pair of leaf queues 74 and 76, and a segment queue 78. The queue management module 40 utilizes the queues associated with each multicast transmission in a similar manner as briefly discussed above with respect to the first multicast transmission and as will be described in greater detail below. As one of ordinary skill in the art appreciates, each line card within a switch may include one or more queue management modules 40 or the switch may include a single queue management module 40 that supports a plurality of line cards.

Figure 3:
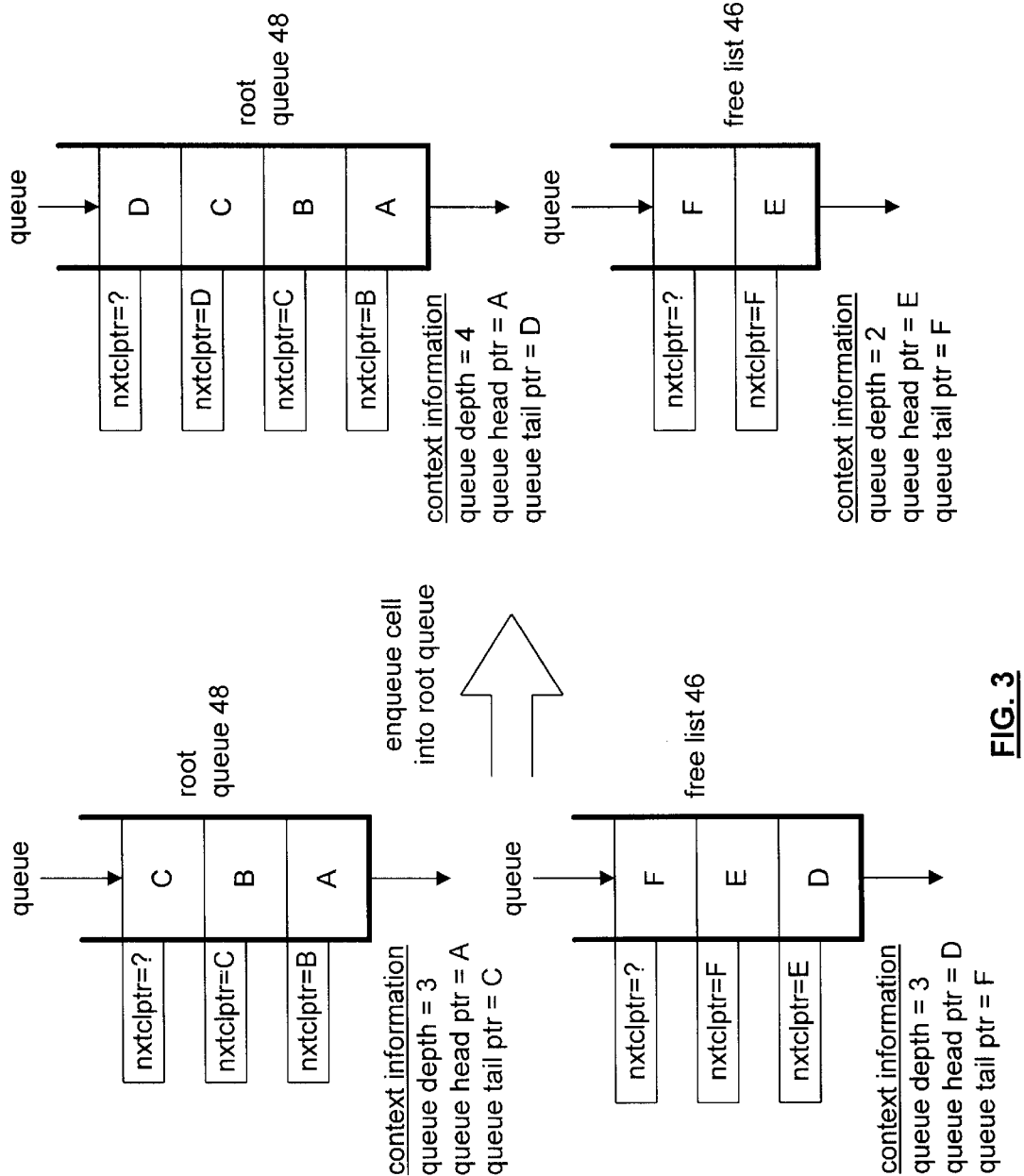
FIG. 3 illustrates a graphical representation of enqueuing cells in accordance with the present invention.

FIGS. 3–10 illustrate graphical representations of the functionality of the queue management module 40 as it processes the first multicast transmission. FIG. 3 illustrates the root queue 48 and the free list 46 at a given moment in time. As shown, the root queue 48, which is preferably a linked list structure, includes three cells, A, B, and C that are linked together via next cell pointers (nxtclptr) associated with each cell buffer of the root queue 48. As shown, cell A has a next cell pointer of B, cell B has a next cell pointer of C, and cell C has an undetermined next cell pointer indicating that cell C is the last entry in the root queue. The free list 46 includes a linked list of available cell buffers that may be utilized by the root queue for enqueuing new data cells. As shown, the free list 46 includes three available entries D, E, and F, each having a next cell pointer value. The root queue 48 and the free list 46 each include context information. For example, the root queue context information includes a queue depth, (e.g. 3), a queue head pointer (e.g. A), and a queue tail pointer (e.g. C), and the free list context information includes a queue depth (e.g., 3), a queue head pointer (e.g., D), and a queue tail pointer (e.g., F).

Figure 4:
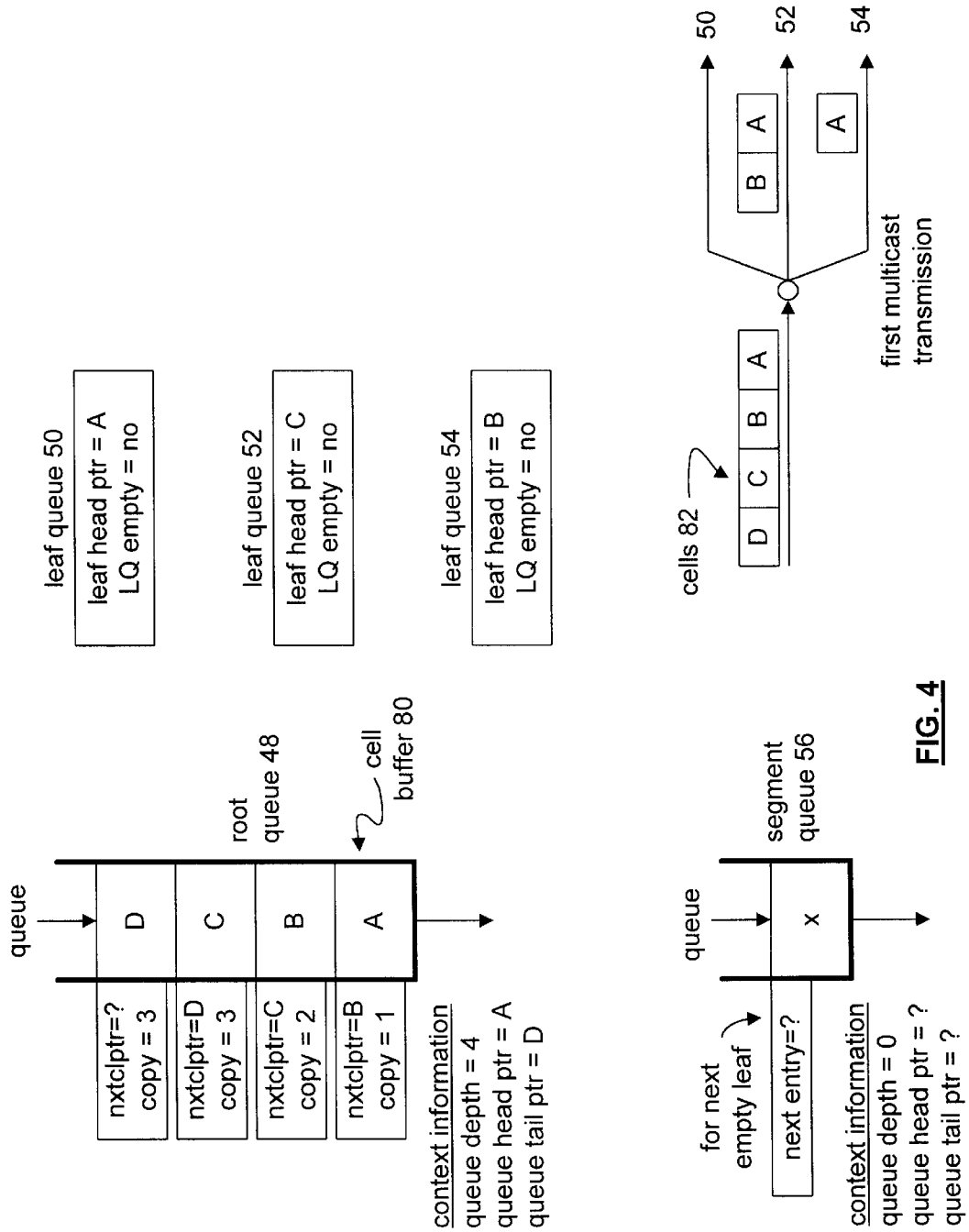
FIG. 4 illustrates a graphical representation of queue management for a data burst in accordance with the present invention.

To enqueue a cell into the root queue 48, the root queue 48 takes the next available cell buffer from the free list 46. As shown in FIG. 4, the root queue 48 adds to the end of its linked list the cell buffer taken from the free list 46. In this illustration, the cell buffer is D. The root queue 48 and free list 46 are adjusted to include the newly added cell. In particular for the root queue 48, the next cell pointer of cell C is updated to point to cell D, and the context information is updated to reflect a queue depth of 4, a queue head pointer of A, and a queue tail pointer of D. Similarly, the free list 46 is updated to remove the information pertaining to cell D such that its use is reflected. As such, the context information for the free list 46 is adjusted to have a queue depth of 2, a queue head pointer of E, and a queue tail pointer of F.

FIG. 4 illustrates, for a given moment in time, the transmission of cells via the egress connections for the first multicast transmission. As shown, the cells 82, which include cells A, B, C and D, are received via the ingress connection and enqueued in the root queue as discussed above. At the point in time illustrated, some of the egress connections have transported data cells. For instance, the top egress connection has not transported any data cells, the middle egress connection has transported data cells A and B, and the bottom egress connection has transported data cell A. As previously, described, each egress connection has a corresponding leaf queue. The leaf queues store leaf queue head pointer information and a leaf queue empty indication. The head pointer indicates the next cell to be copied, or retrieved, from the root queue 48 and transported via the corresponding egress connection. In this illustration, leaf queue 50 corresponds to the top egress connection, leaf queue 52 corresponds to the middle egress connection, and leaf queue 54 corresponds to the bottom egress connection.

As shown, the middle egress connection has transported cells A and B. As such, the head pointer of leaf queue has been updated to point to cell C, which is the next data cell in the root queue to be transported via this egress connection. The bottom egress connection has transmitted cell A. As such the corresponding leaf queue 54 includes the leaf head pointer pointing to cell B. Since there are data cells remaining in the root queue, which is readily determined by comparing the leaf head pointer for each leaf queue with the root queue tail pointer, the leaf queue empty indications of the leaf queues 50–54 are not set. Note that the leaf queue empty indication will be set when the corresponding egress connection has transported all of the cells contained in the root queue, which is determined when the leaf queue head pointer matches the root queue tail pointer following dequeuing (transmission over the egress connection corresponding to the leaf queue) of the cell identified by both the leaf queue head pointer and the root queue tail pointer. It should also be noted that the leaf queue head pointer will match the root queue tail pointer when there is one cell left to be transmitted, and the empty indicator in each leaf queue is used to indicate that transmission of the last cell in the root queue has been accomplished.

The root queue 48 includes additional information for each cell buffer 80, such as a copy count that indicates how many times the corresponding cell is to be copied for transporting via the plurality of egress connections. As shown in this example, the initial copy count is equal to the number of egress connections, which is 3. As also shown, cell A has been transmitted twice, and, as such, the corresponding copy count has been decremented by 2. Cell B has been transmitted via the center egress connection and, as such, the corresponding copy count for cell B has been reduced by 1. Cells C and D have not yet been transmitted via any of the egress connections, and their corresponding copy counts remain at 3. Note that the egress connections may be logically multicast egress connections in which a single line card or port is used to transport data to a plurality of destinations, where each destination corresponds to one of the egress connections. Further note that the egress connections may be spatially multicast connections such that each egress connection utilizes a separate line card or port.

FIG. 4 also illustrates a graphic representation of the segment queue 56. The segment queue 56 stores the identity of leaf queues that are empty, i.e. have their corresponding leaf queue empty indication set. In this example, none of the leaf queues are empty, and therefore the segment queue 56 is empty. Further note that the segment queue 56 includes context information that includes a queue head pointer and a queue tail pointer. In addition, the segment queue context information may include a queue depth parameter.

Figure 5:
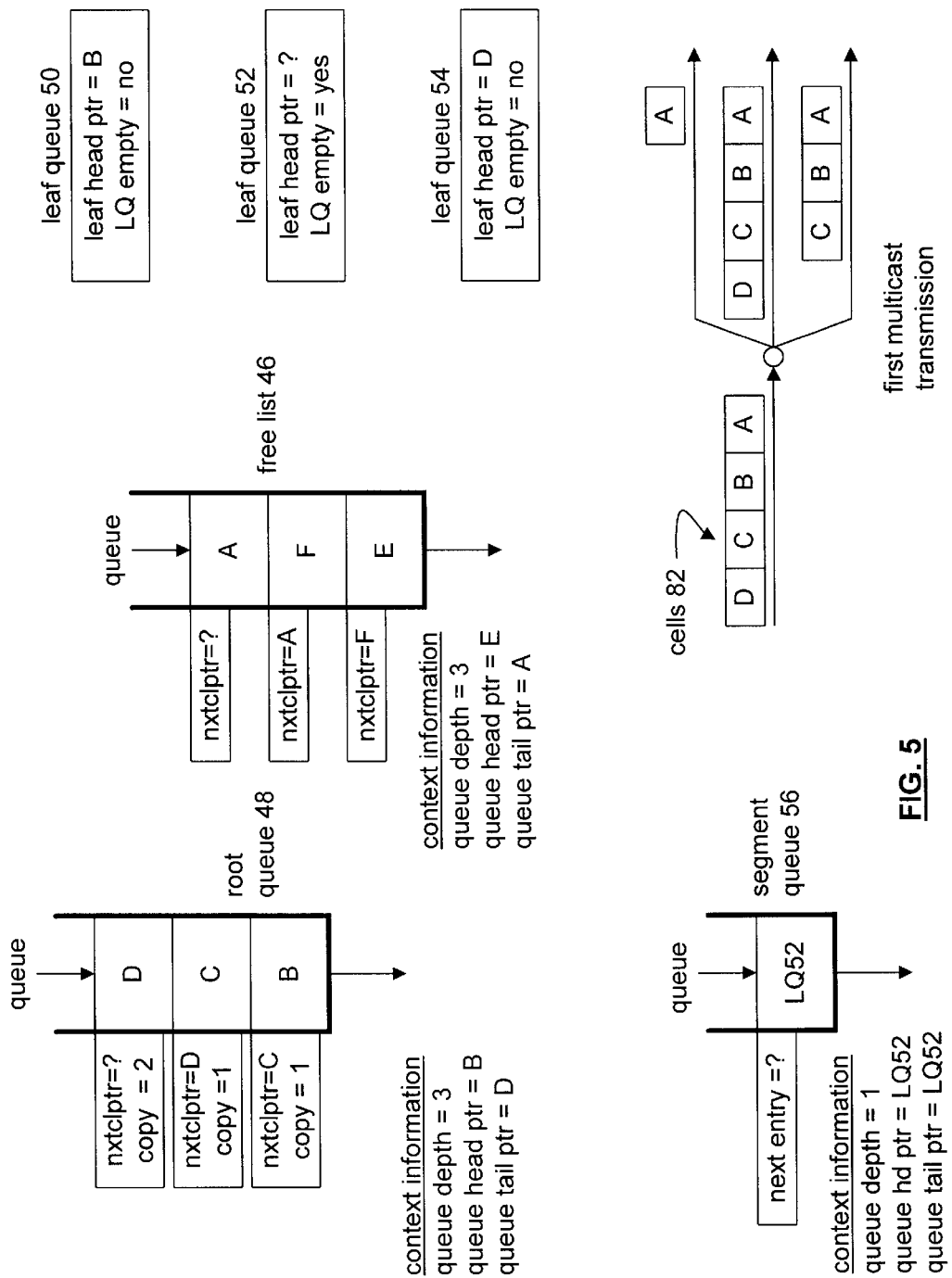
FIG. 5 illustrates a graphical representation of further queue management for a data burst in accordance with the present invention.

FIG. 5 illustrates a graphical representation of the first multicast transmission at a subsequent time interval to that illustrated in FIG. 4. In this illustration, the center egress connection has transmitted all four of the cells stored in the root queue 48, the top egress connection has transmitted cell A, and the bottom egress connection has transmitted cells A, B, and C. As such, the corresponding leaf queues have been updated accordingly. In particular, the leaf queue 50, which corresponds to the top egress connection, has the leaf queue head pointer updated to B, which is the next data cell to be transported via this egress connection. Since this particular egress connection has not transported all of the cells contained in root queue 48, the leaf queue empty indicator is not set. The leaf queue 52, which corresponds to the center egress connection, has an unidentified leaf queue head pointer, and, as such, has the leaf queue empty indication set.

By setting the leaf queue empty indication, the queue management module 40 uses this information to remove the corresponding egress connection from a transport process (i.e., the transporting of the data cells contained in the root queue 48 to active egress connections). In addition, the leaf queue 52 is identified within segment queue 56 as being empty. Note that by removing egress connections that have transported all of the data cells currently contained in the root queue 48, processing resources are conserved as the scheduling entity that tracks bandwidth grants to egress connections does not have to manage removed egress connections. The specific operation of the scheduling entity is outside the general scope of the discussion provided herein.

The leaf queue 54, which corresponds to the bottom egress connection, has been updated to indicate that the next data cell to transmit is cell D. Since all of the egress connections have transmitted cell A, the corresponding copy count of cell A is 0. When the copy count of a cell buffer within the root queue 48 is reduced to a terminal count value, which is assumed to be zero in the examples illustrated, the cell buffer is transferred to the free list 46. The newly available cell buffer is added to the tail end of the free list 46. As shown, the corresponding context information of the root queue 48 and the free list 46 has been updated to reflect these changes. In addition, the copy count information for each of the cells contained within the root queue 48 has been updated to indicate the number of egress connections that still need to transport each of the corresponding cells.

Figure 6:
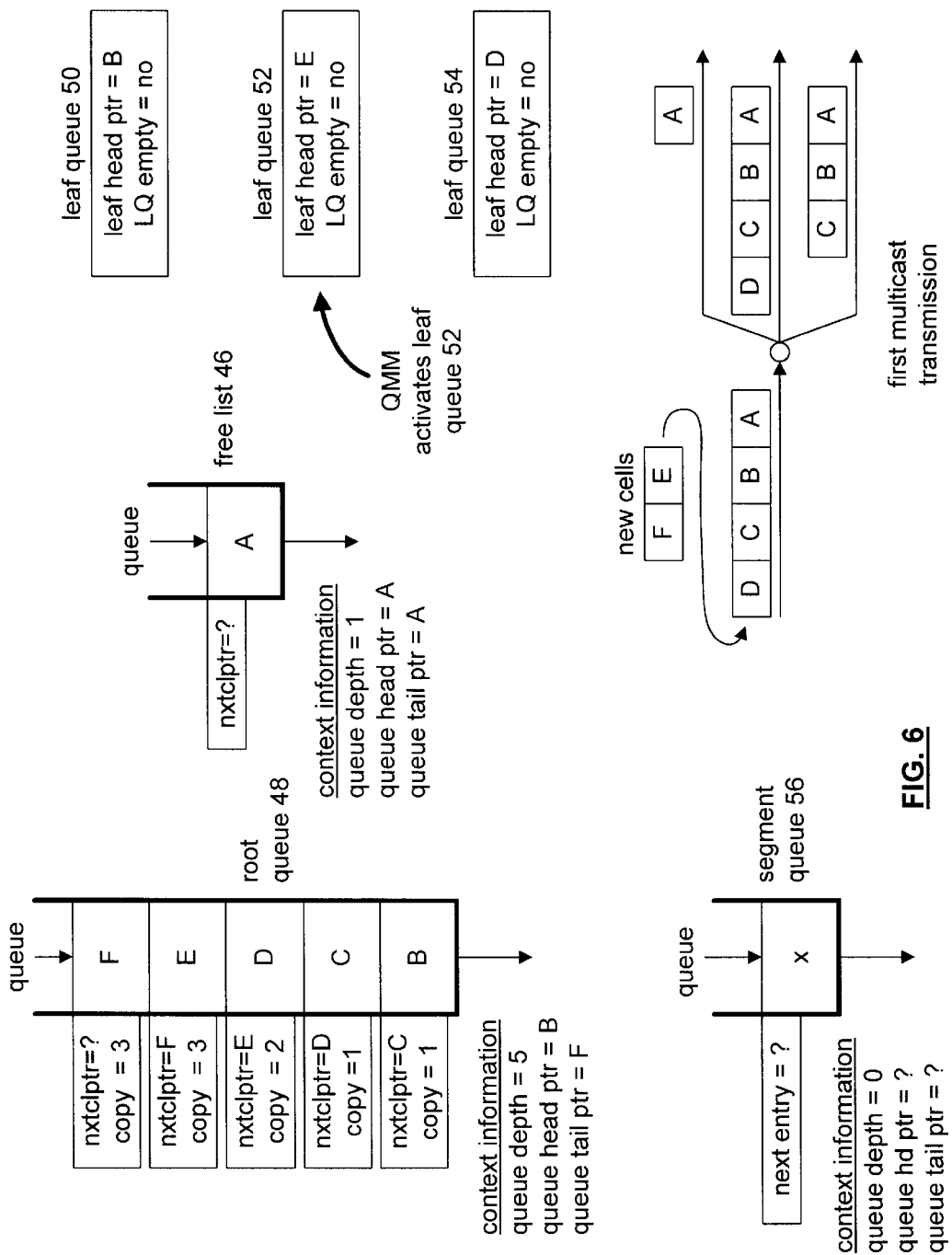
FIG. 6 illustrates a graphical representation of queue management for a new data burst in accordance with the present invention.

FIG. 6 illustrates a subsequent time interval to that of FIG. 5 in which new cells E and F have been received before any further cells in the root queue 48 have been transported via the egress connections. At this point, the new cells E and F have been added to the root queue 48 at the tail end of the linked list. The copy count values of the new cells are set to correspond to the number of egress connections (e.g., the fan out) for the multicast transmission. In addition, the context information for the root queue has been updated. In particular, the queue depth is now 5, the queue head pointer is B, and the queue tail pointer is F. The free list 46 has also been updated to reflect that cell buffers have been removed for use.

As a result of receiving the burst of data, which includes new cells E and F, the leaf queue 52 needs to be activated such that the queue management module 40 will again include it in the transport process. The queue management module 40 activates the leaf queue 52 upon: (1) detecting an addition to the root queue 48 (i.e., a change in the tail pointer); and (2) detecting that the leaf queue empty indication of the corresponding leaf queue is set. When these conditions exist, the queue management module activates the leaf queue 52 by clearing the leaf queue empty indication and updating the leaf queue head pointer to point to the cell buffer identity of the first newly received cell.

Note that the queue management module 40 may activate leaf queues while the new cell(s) is/are being added to the root queue 48, or at a subsequent time. Assuming that it takes a predetermined enqueuing time period to store a cell in the root queue 48, the queue management module 40 may activate a predetermined number of leaf queues during that predetermined enqueuing time period. The number of leaf queues that may be activated during the predetermined enqueuing time period is based on the processing speed of the queue management module 40. For example, the queue management module may be capable of activating only one leaf queue while a cell is being stored in the root queue. Conversely, if a cell is not being stored in the root queue, the queue management module may be capable of activating more leaf queues in the same amount of time. As one of average skill in the art appreciates, the number of leaf queue activations in a given time interval may increase as the processing speed of the queue management module increases. Activation of the leaf queues is discussed in additional detail below.

Figure 7:
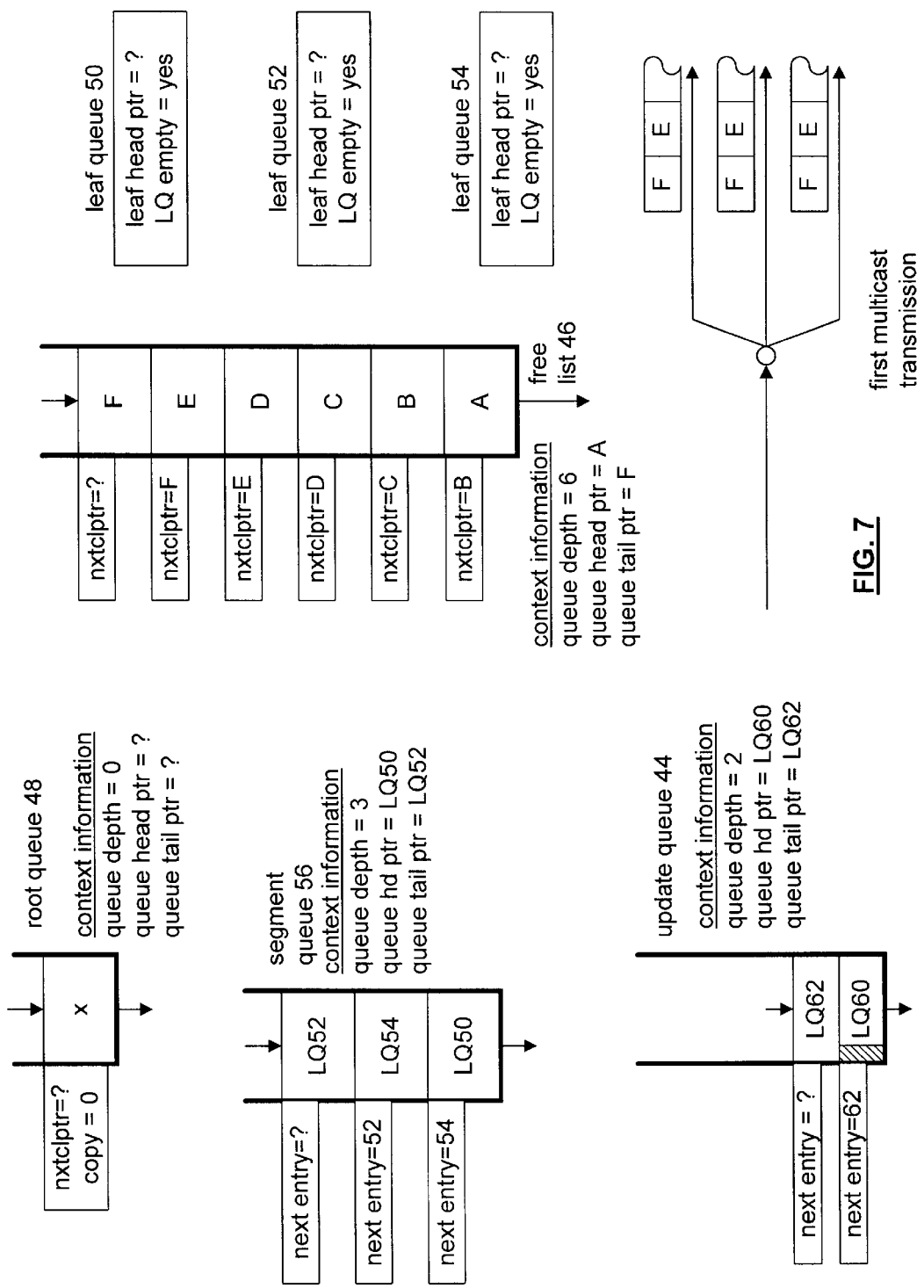
FIG. 7 illustrates a graphical representation of queue management between data bursts in accordance with the present invention.

FIG. 7 illustrates a subsequent time interval to that of FIG. 6 where no new cells have been received, and where all of the cells previously stored in the root queue 48 have been transported via each of the egress connections. In this illustration, the root queue 48 is empty, the segment queue 56 includes the identity of each of the leaf queues 50, 52 and 54, and the free list 46 is full. The corresponding context information for the root queue 48, the segment 56, and the free list 46 has been updated accordingly.

The update queue 44 is used to control activation of empty leaf queues. When a new cell is received in the root queue 48, the contents of the segment queue 56, which contains the empty leaf queues 50–54 corresponding to the root queue 48, is appended as a segment to the update queue 44 such that these leaf queues will be activated. The segment is not appended to the update queue 44 until the new cell is in the root queue 48, as premature inclusion of the segment in the update queue 44 may prevent the leaf queues of another transmissions from being activated in a timely manner. This is because the leaf queues in the segment cannot be activated until the new cell is in the root queue 48. In the example illustrated in FIG. 7, the update queue 44 currently stores a segment associated with the second multicast transmission. This is because new cells have been received for transmission in the second multicast transmission, thus requiring the activation of the leaf queues 60 and 62.

Figure 8:
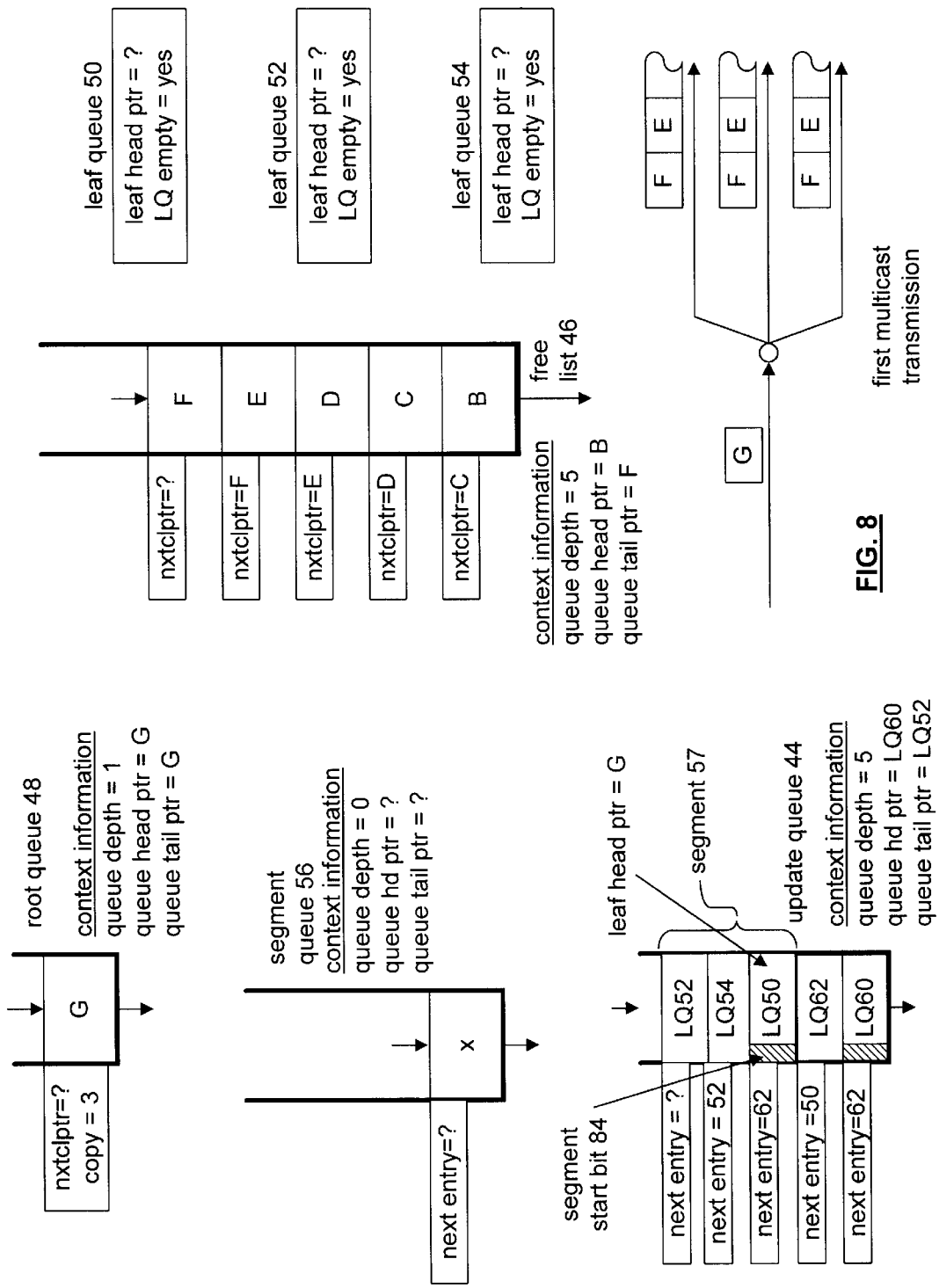
FIG. 8 illustrates a graphical representation of queue management at the beginning of a subsequent data burst in accordance with the present invention.

FIG. 8 illustrates a subsequent time interval to that of FIG. 7 in which a new cell G has been received for transmission. Note that the cell buffer previously labeled A has been retrieved from the free list 46 and used to store the data associated with cell G. For clarity of explanation, the cell buffer is labeled G for the remainder of the discussion. However, it should be recognized that the same cell buffers are reused to store incoming data cells.

Upon arrival of the cell G, which may be part of a data burst that includes a plurality of cells, the segment 57 is transferred from the segment queue 56 to the update queue 44. A segment start bit 84 corresponding to the leaf queue 50 (LQ50) portion of the segment 57 is set to indicate the start of the segment 57. A leaf head pointer for the leaf queue 50 in the update queue that points to the cell G in the root queue 48 is also included such that when the leaf queues in the segment are activated, the head pointers for the leaf queues will point to the first cell that needs to be transmitted from the root queue. Assuming that both queues are structured as linked lists, the segment can be appended to the update queue by simply manipulating the pointers associated with the queues. As can be seen the context information of segment queue 56 and the update queue 57 is updated to reflect the movement of the segment 57 to the update queue 44. As briefly discussed earlier, in some embodiments the segment 57 may not be appended to the update queue 44 if the number of leaf queues in the segment queue 56 is small enough that the leaf queues can be activated while a newly received cell (which triggers the activation) is being enqueued in the root queue 48. In such cases, the leaf queues may be activated without the use of the update queue. Note that in other embodiments, some of the empty leaf queues included in the segment queue may be activated during receipt of the new cell G. In such an embodiment, the identities of these leaf queues that are activated without the need for the update queue 44 would be removed from the segment 57 prior to appending it to the update queue 44.

The first leaf queue in the segment 57, or the segment head, has a segment start indication (bit) 84 that is set. The segment start indication 84 allows the queue management module to identify the beginning of a segment within the update queue 44. In the illustration of FIG. 8, the update queue 44 includes the three leaf queues from the first multicast transmission and the identity of two leaf queues from the second multicast transmission that have been appended to the update queue 44 prior to the addition of the segment 57. As such, the update queue 44 contains two segments, one for the first multicast transmission and one for the second multicast transmission. The update queue 44 is arranged as a linked list and is accessed on an entry-by-entry basis for a corresponding segment. For example, when the segment 57 reaches the front of the update queue 44, the three leaf queues are processed sequentially, i.e. in a linked list dequeuing matter where each entry in the linked list is processed sequentially. Preferably, leaf queues are added to the segment queue 56 in the order that they become empty, and segments are included in the update queue 44 in the order that new cells are added to their corresponding root queues. This controls prioritization with respect to leaf queue activation.

Figure 9:
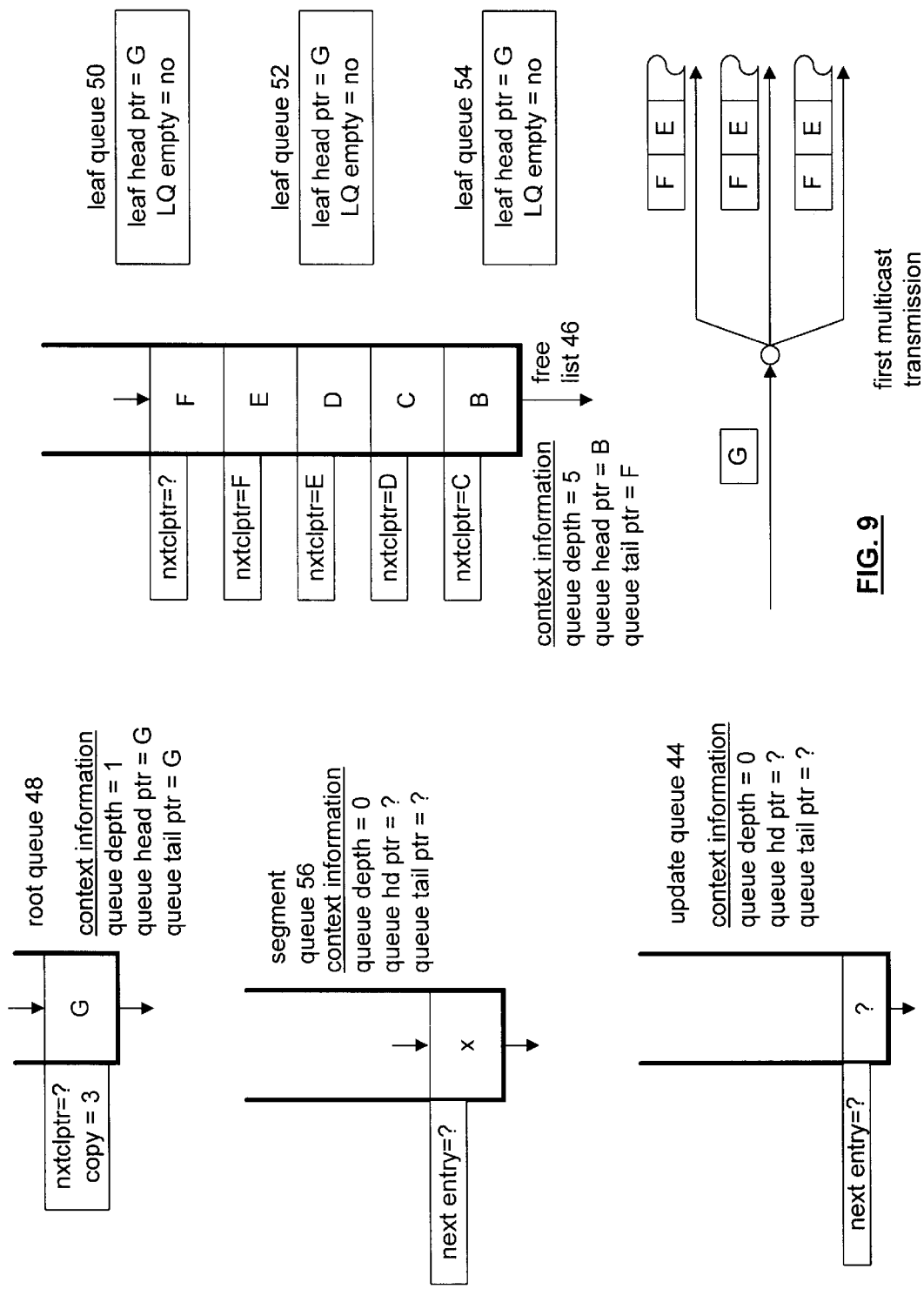
FIG. 9 illustrates a graphical representation a subsequent step in the queue management at the beginning of the subsequent data burst in accordance with the present invention.

FIG. 9 illustrates a subsequent time interval to that of FIG. 8 where the leaf queues 50–54 have been activated. Because the leaf queues 50–54 have been activated, they have been removed from the update queue 44 and each of the leaf queue empty indications has been cleared. The leaf head pointer for each of the leaf queues 50–54 has been updated to point to the cell G in the root queue. This may be accomplished by copying the leaf queue head pointer for the first leaf queue as included in the segment to the leaf queue head pointers for each of the leaf queues as they are activated.

Figure 10:
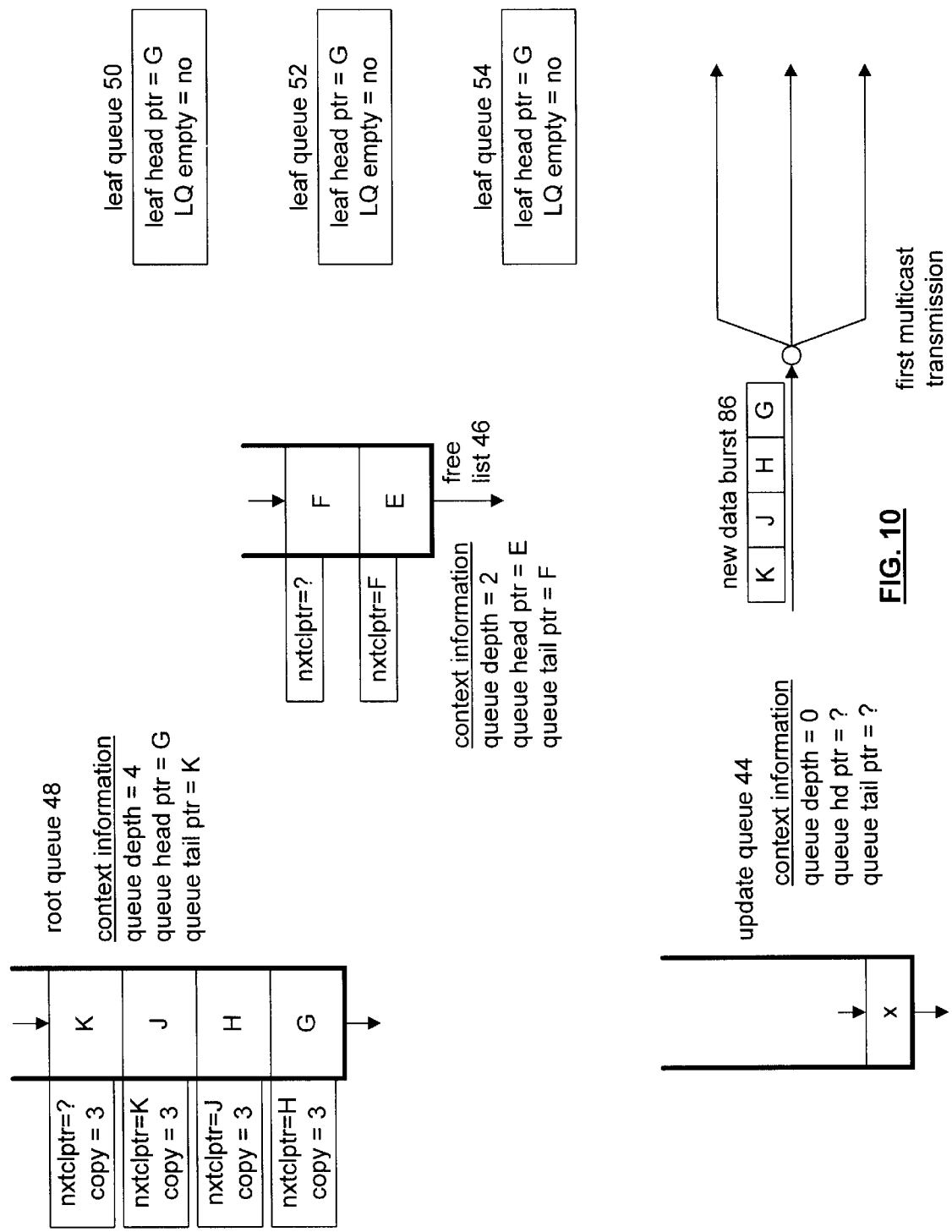
FIG. 10 illustrates a graphical representation of another subsequent step in the queue management at the beginning of the subsequent data burst in accordance with the present invention.

FIG. 10 illustrates a subsequent time interval to that of FIG. 9 where additional cells included in the new burst of data 86 have been received for the first multicast transmission. The new burst of data 86 includes cell G and the additional cells H, J, and K, which have been added to the root queue 48. The cells H-K are stored in cell buffers taken from the free list 46, and the cell buffers formerly labeled B-D are utilized to store these newly received cells. The corresponding context information, the linked list information (i.e., the next cell pointer), and copy count information for each cell in the root queue has been updated. The free list 46 has also been updated to reflect the use of the four cell buffers that now store cells H-K.

As stated earlier, the queue management module 40 may utilize the update queue 44 to activate leaf queues 50–54. When a new cell is received and enqueued in the root queue 48, the leaf head pointer of the first leaf queue in the segment 57 is set to correspond to the tail pointer of the root queue, which points to the cell buffer storing the newly enqueued cell. In order to activate each of the leaf queues in the segment 57, the segment start bit is used to determine the location of the first leaf queue that includes a leaf head pointer corresponding to the newly received cell. Because this leaf head pointer is appropriate for any additional leaf queues stored in the segment 57, the leaf head pointer of the first leaf queue can be copied to the other leaf queues in the segment. The end of the segment 57 in the update queue is determined by either another segment start bit indication or the end of the update queue 44. By linking the identity of the leaf queues in a segment 57, a single logical queue record may be used to store the new leaf head pointer that corresponds to a newly enqueued cell which can then be used to update all subsequent leaf queues identified in the segment. As such, less processing is required to update the leaf head pointers and request connection scheduling when a new data burst is received.

In the example illustrated in FIGS. 8–10, the newly received cells G-K correspond to segment 57. As such, for each enqueuing of a new cell in the root queue 48, the queue management module will retrieve as many leaf queue identifiers from the update queue as it can activate during the cell enqueuing period. For example, if the queue management module is capable of processing a single leaf queue activation while simultaneously enqueuing a new data cell, the queue management module will retrieve one leaf queue identifier from the update queue for each queuing of a new cell into the root queue. If the queue management module is capable of activating three leaf queues during a queuing interval when a new cell is not being enqueued into the root queue, the queue management module would retrieve the next three leaf queues from the update queue 44.

Figure 11:
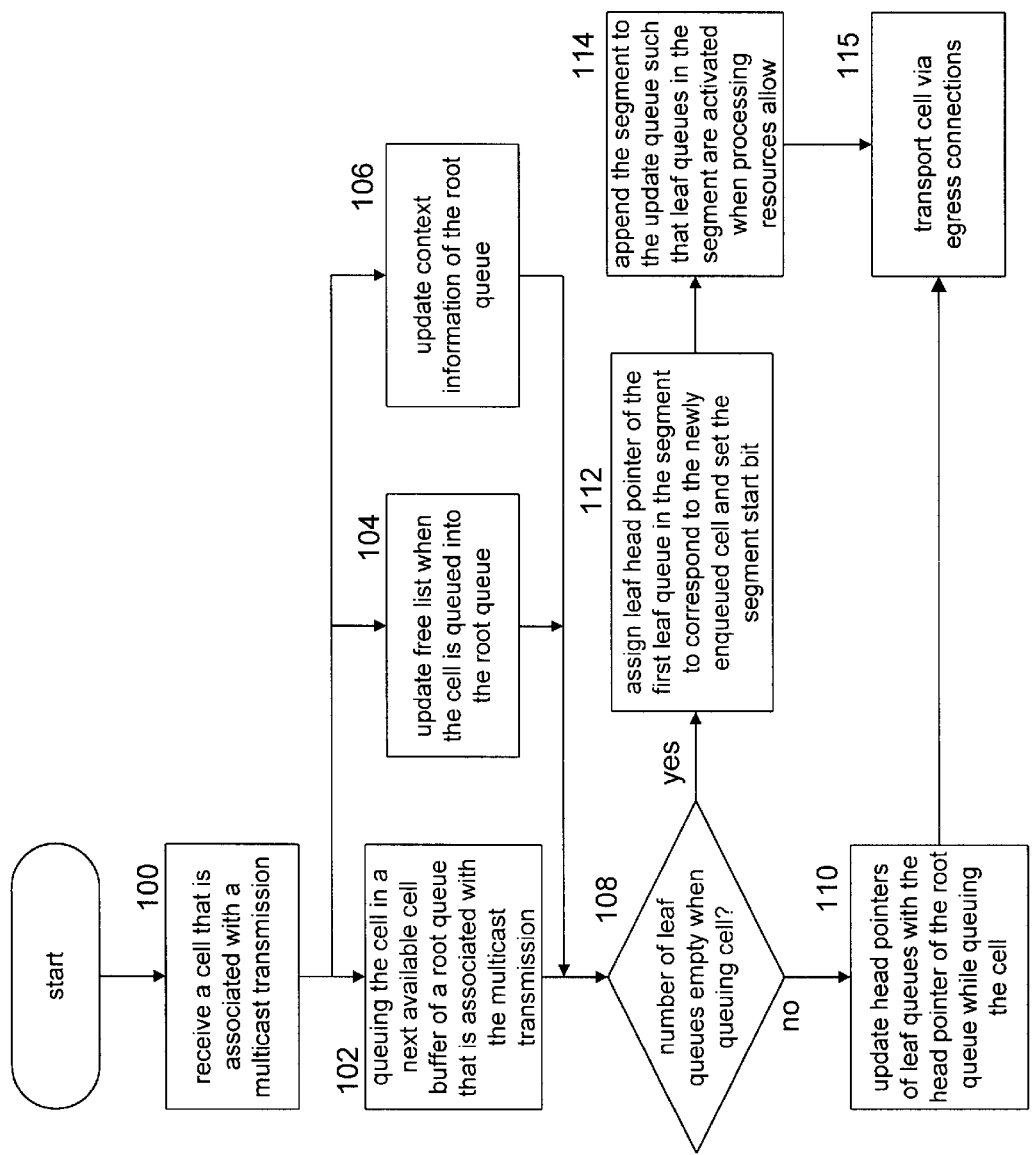
FIG. 11 illustrates a flow diagram of a method for per connection queuing of multicast transmissions in accordance with the present invention.

FIG. 11 illustrates a flow diagram of a method for per connection queuing of multicast transmissions, where the multicast transmissions may be logical multicast transmissions such that multiple destinations for the multicast transmissions are serviced via a single port within a switch. The process begins at step 100 where a cell that is associated with a multicast transmission is received. The process then proceeds to steps 102, 104 and 106. At step 102, the cell is enqueued into a next available cell buffer of a root queue. The root queue is associated with the multicast transmission, and such an association provides the per connection queuing. At step 104, a corresponding free list is updated when the cell is added to the root queue. Updating the free list includes removing a cell buffer entry from the free list, as that cell buffer entry is used to enqueue the received cell in the root queue. The context information for the free list is updated accordingly. At step 106, the context information of the root queue is updated as described earlier.

The process then proceeds to step 108 where a determination is made as to whether a predetermined number of leaf queues are empty when the cell is enqueued into the root queue. The predetermined number is related to the number of leaf queues that can be activated while the newly received cell is being enqueued. Note that each egress connection of the multicast transmission has a corresponding leaf queue. Each leaf queue becomes empty when all of the cells in the root queue have been transported via the corresponding egress connection.

If there are not a predetermined number of empty leaf queues (i.e. if the number of empty leaf queues is less than or equal to the number of empty leaf queues than can be activated while the newly received cell is being enqueued), the process proceeds to step 110. At step 110, the head pointers of the empty leaf queues, if any exist, are updated with a pointer corresponding to the cell buffer containing the newly received cell while the cell is being enqueued. Note that the context information of the leaf queues is also updated at this time. As described earlier, context information of the leaf queues includes a leaf queue head pointer and a leaf queue empty indicator. Note that there may be no empty leaf queues, and as such, there may be no need to update head pointers at step 110.

If it is determined at step 108 that a predetermined number of leaf queues are empty when the cell is queued (i.e. if there are more leaf queues to be activated than can be activated during the time period during which the newly received cell is being enqueued), the process proceeds to step 112. At step 112, the leaf head pointer of a first leaf queue in a segment queue (which stores empty leaf queues) is assigned to correspond to the cell buffer storing the newly enqueued cell. A segment start bit in the first leaf queue in the segment queue is also set at step 112, where the segment start bit allows the beginning of the segment to be determined.

At step 114, the identities of the leaf queues in the segment queue are added to an update queue (e.g. appended to the back of the update queue through pointer manipulation) as a segment, wherein the update queue is associated with a plurality of multicast transmissions. Processing limitations of the queue management module then determine when the leaf queues included in the segment are activated. When a leaf queue is activated, its empty indication is cleared. The activation is accomplished by copying the leaf queue head pointer of the first leaf queue in the segment to the other leaf queues in the segment. As such, as they are activated, the leaf head pointer of each formerly empty leaf queue will point to the cell buffer storing the newly received cell. The number of leaf queues that may be updated during a queuing interval varies depending on whether the queue management module is currently queuing a cell or not. If the module is not currently enqueuing a cell, where such a time interval may be referred to as a root queue service vacancy interval, the queue management module may update more leaf queues than is possible while cell enqueuing is taking place.

At step 115 the cells are transported via the egress connections on an individual basis. Transmission of the cells on each egress connection will occur based on a dequeuing methodology. Once a cell has been transported via one of the egress connections, a copy count of the cell within the root queue is decremented. In addition, the head pointer of the corresponding leaf queue is updated to point to the next cell in the root queue. Once the copy count of the cell within the root queue reaches a terminal count value (e.g. the cell has been transmitted on all of the appropriate egress connections), the cell is dequeued from the root queue and the corresponding cell buffer is subsequently added to the free list. Note that the leaf head pointers of the leaf queues are individually updated when the corresponding egress connection transports a cell.

Utilizing the segment queue to store leaf queues that have been dequeued (deactivated) greatly simplifies activation of these queues when a new cell is enqueued in the root queue. In the case where the segment within the segment queue is large enough that all of the leaf queues within the segment cannot be activated while the newly received cell is being enqueued, the segment is simply appended to the update queue, which is serviced as processing resources permit. Structuring the various queues in the system as linked lists allows for easy manipulation the data relating to the identity of cell buffers and queues. Pointer manipulations are all that is required to append a segment to the update queue, which allows a large number of leaf queues to be activated in an efficient manner.

FIG. 12 illustrates a flow diagram of an alternate method for per connection queuing of multicast transmissions. The process begins at step 130 where cells are received via ingress connections of a plurality of multicast transmissions. The process then proceeds to step 132 where the cells are enqueued into corresponding root queues of a plurality of root queues. Note that a root queue corresponds to one of the plurality of multicast transmissions and the multicast transmissions may be structured as logical multicast transmissions such that a plurality of destinations are serviced via a single port, within a line card. As a root queue is updated with a newly received cell, a corresponding free list is updated to reflect the usage of a cell buffer.

When a selected cell of the received cells is enqueued in a selected root queue corresponding to a selected transmission, the process proceeds to step 134. Note that the 10 selected cell is used for illustrative purposes, and may be any cell within the cells received. At step 134, a determination is made as to whether a selected segment queue of a plurality of segment queues is non-empty. The segment queue corresponds to the selected multicast transmission. As described earlier, each segment queue stores the identity of empty leaf queues corresponding to a particular root queue. If the segment 15 queue is empty, the process proceeds to step 136 where context information of the selected root queue in which the selected cell is enqueued is updated while the cell is being enqueued. If the segment is not empty, as determined at step 134, the process proceeds to step 138.

At step 138, a determination is made as to whether the segment queue includes a predetermined number of leaf queues, where the predetermined number is related to how many leaf queues can be activated during a cell enqueuing. If there are not a predetermined number of leaf queues in the segment queue, the process proceeds to step 140 where the empty leaf queues in the segment queue are activated while the selected cell is being enqueued in the selected root queue. The method then proceeds to step 136.

If the segment queue includes at least the predetermined number of leaf queues (i.e. more than could be activated while the received cell is being enqueued), the method proceeds to step 142. At step 142, the identities of the leaf queues included in the segment queue are appended to an update queue as a segment. The update queue is a linked list, and may include a number of segments from number of multicast transmissions, and may also include multiple segments corresponding to the same multicast transmission. The process then proceeds to step 143 where the context information of the selected root queue is updated and then on to step 144. At step 144, the empty leaf queues in the segment are activated as the segment is accessed in the update queue, which is performed as processing resources permit. The process then proceeds to step 146 where the cells are provided to the destinations via the egress connections.

FIG. 13 illustrates a flow diagram of a method for adding an egress connection to or deleting an egress connection from a multicast transmission. The process begins at step 150 where a determination is made as to whether an egress connection is to be added to the multicast transmission. If so, the process proceeds to step 152 where a determination is made as to whether the segment queue corresponding to the multicast transmission is empty. If the segment queue is not empty, the process proceeds to step 154 where the identity of the leaf queue associated with the new egress connection is added to the segment queue. Note that a plurality of egress connections may be added by adding a linked list including all of the new leaf queue identifiers to the segment queue. The process then proceeds to step 156 where the fan out of the root queue is increased by the number of connections added. Thus, cells received after the fan out increase will include the updated cell count reflecting the increased fan out.

If, however, the segment queue for the particular root queue to which the connection(s) is being added is determined to be empty, the process proceeds from step 152 to step 158. At step 158 a segment is activated via an activation indicator. The activation indicator corresponds to setting a segment start bit in the segment queue such that the beginning of the segment is recognizable. The process then proceeds to step 160 where the identity of the leaf queue corresponding to the new egress connection becomes the first entry of the segment queue. As stated earlier, multiple connections may be added by adding a linked list of the leaf queue identifiers for the new connections to the segment. In such an instance, only the first leaf queue identifier in the segment queue will include the segment start bit indication. When the segment is appended to the update queue for activation of the new connections, the start of segment identifier will be used to allow for the activation of the multiple leaf queues to be performed in an efficient manner.

If an egress connection is to be deleted, or removed, from the multicast connection, the process proceeds from step 162 to step 164. At step 164 a current tail pointer of the root queue is flagged. This allows for recognition of the endpoint in terms of cell transmission for the connection being removed. The process then proceeds to step 166 where a determination is made as to whether the leaf queue is empty. In other words, it is determined whether or not the connection being deleted has completed transmission of all of the cells received before the indication to delete the connection was received. If yes, the process proceeds to step 168 where the egress connection is deleted. The process then proceeds to step 170 where the fan out of the root queue is decremented which will be reflected in the copy counts of cells received after the indication to delete the connection.

If there are still cells to be transmitted by the connection being deleted, the process proceeds to step 172 where a delete active bit or other indication is set. The process then proceeds to step 174 where the current root tail pointer is copied into a terminal cell buffer indicator, which may be part of the leaf queue context information. The cells in the root queue continue to be transported by the egress connection to be deleted until the terminal cell buffer indicator is reached, and the egress connection has dequeued the final cell as indicated by the terminal cell buffer indicator. This is illustrated at step 176. Once the cell buffer indication is reached, the egress connection is deleted, and the fan out of the root queue is updated accordingly at steps 168 and 170. As such, the cells that were enqueued prior to the notice that the egress connection was to be deleted are provided to the egress connection before it is deleted.

It should be noted that the methods and systems described thus far with respect to multicast transmissions involving a plurality of destinations are also applicable to singlecast transmissions, which are multicast transmissions with a single destination.

Another application for the methods and systems described herein is in the establishment of Test Access Connections (TACs) on connections corresponding to multicast transmissions. TACs allow a multicast leaf to be added to any multicast connection such that the connection can be monitored. TACs enable a connection to be monitored at different points in the path from source end system to destination end system. Essentially, the TAC allows the multicast connection to be "tapped" and monitored by a Destination End System (DES). The DES, which may be a technical service center of a network service provider, may use one or more TACs to detect and analyze transmission problems within the path of the transmission. Because the addition of a TAC to a multicast transmission is likely to have little effect on the performance characteristics of the multicast transmission, the transmission characteristics monitored by the TAC are likely to provide an accurate picture as to the performance of the other connections in the multicast transmission. When a TAC is no longer required for monitoring a connection, the leaf established for the TAC can simply be deleted.

In one embodiment, the addition of a TAC can occur such that the egress connection of the TAC is supported by the same line card as the rest of the connections for the multicast transmission to which the TAC corresponds. In this embodiment, the TAC can be established in either in the ingress line card corresponding to the multicast transmission or in the egress line card that supports the egress connections of the multicast transmission. In other embodiments, the TAC may be implemented such that it utilizes a different line card that that which supports other connections of the multicast transmission to which the TAC corresponds. In these embodiments, the TAC will have to be implemented in the ingress line card of the multicast transmission such that the TAC can be routed through the switching fabric of the switch to the appropriate egress line card.

As described in the specification and accompanying claims, the term "cell" is used to include data packets that may be of a fixed or variable length. As such, the term "cell" would include fixed length cells such as ATM cells and packets of data that may be of variable length such as IP packets.

The preceding discussion has presented a method and apparatus for per connection queuing of multicast transmissions wherein data may be received in bursts. By providing such a method and apparatus, logical multicast transmissions may be processed without loss of data and with minimal processing overhead. As one of average skill in the art appreciates, other embodiments may be readily derived from the preceding discussions that are within the scope of the claimed invention.

What is claimed:

1. A method for per connection queuing of multicast transmissions, comprising:

receiving a cell associated with a multicast transmission;

queuing the cell in a next available cell buffer of a root queue that is associated with the multicast transmission;

determining whether a predetermined number of leaf queues associated with the multicast transmission are empty when the queuing of the cell commences;

when there are at least the predetermined number of the leaf queues that are empty when the queuing of the cell commences, queuing the leaf queues that are empty into an update queue; and updating at least some of the leaf queues that are empty with a head pointer corresponding to the cell in the root queue, wherein the updating is performed based on dequeuing of the leaf queues from the update queue subsequent to the queuing of the cell.

2. The method of claim 1, wherein queuing the leaf queues that are empty into the update queue further comprises appending a segment to the update queue, wherein the segment is generated in a segment queue that stores identity of empty leaf queues, wherein the update queue is associated with a plurality of multicast transmissions.

3. The method of claim 1 further comprises, when there are less than the predetermined number of leaf queues that are empty when the queuing of the cell commences, updating the leaf queues that are empty further comprises updating the leaf queues that are empty during queuing of the cell.

4. The method of claim 3, wherein updating a leaf queue further comprises updating leaf queue context information that includes a leaf head pointer and a leaf queue empty indicator.

5. The method of claim 1, wherein updating at least some of the leaf queues that are empty further comprises updating leaf head pointers of the at least some of the leaf queues that are empty during a root queue service vacancy interval.

6. The method of claim 1, wherein queuing the cell in the next available cell buffer further comprises:
retrieving the next available cell buffer from a free list, wherein the free list stores available cell buffers; and
updating the free list to reflect usage of the next available cell buffer.

7. The method of claim 1, wherein queuing the cell in the next available cell buffer further comprises updating cell buffer context information that includes a next cell pointer and a copy count, wherein the copy count identifies a number of destinations that have yet to read the cell from a corresponding cell buffer of the root queue.

8. The method of claim 7 further comprises:
providing the cell from the root queue to an egress connection associated with a selected leaf queue of the leaf queues;
decrementing the copy count;
updating a head pointer of the selected leaf queue; and
when the copy count reaches a terminal count value, dequeuing the cell buffer from the root queue.

9. The method of claim 8, wherein updating the head pointer of the selected leaf queue further comprises:
determining if the head pointer of the selected leaf queue indicates, based on present state of the root queue, that the selected leaf queue is empty; and
when the selected leaf queue is empty, adding identity of the selected leaf queue to the segment queue.

10. The method of claim 1, wherein at least one of the leaf queues associated with the multicast transmission supports a test access connection (TAC), wherein the test access connection provides cells to a destination end system (DES).

11. A method for managing per connection queuing of a plurality of multicast transmissions, comprising:
a) receiving cells via ingress connections of the plurality of multicast transmissions, wherein each of the plurality of multicast transmissions includes an ingress connection and a plurality of egress connections;
b) queuing the cells in a plurality of root queues, wherein each of the plurality of root queues is associated with a corresponding one of the plurality of multicast transmissions;
c) when a selected cell of the cells is queued in a selected root queue of the plurality of root queues corresponding to a selected multicast transmission of the plurality of multicast transmissions, determining whether a selected segment queue of a plurality of segment queues is non-empty, wherein each of the plurality of segment queues is associated with a corresponding one of the plurality of multicast transmissions, wherein the selected segment queue corresponds to the selected multicast transmission, wherein the selected segment queue stores indications of empty leaf queues corresponding to the selected multicast transmission, wherein leaf queues corresponding to the selected multicast transmission control transmission of cells on egress connections for the selected multicast transmission; and
d) when the selected segment queue is non-empty, appending entries in the selected segment queue to an update queue as a segment, wherein the update queue is used to activate the empty leaf queues, wherein activating the empty leaf queues includes updating a leaf head pointer in each of the empty leaf queues to reflect presence of the selected cell in the selected root queue.

12. The method of claim 11 further comprises:
determining when a leaf queue of the plurality of leaf queues is empty; and
when the leaf queue is empty, adding identify of the leaf queue to a corresponding one of the segment queues.

13. The method of claim 11, wherein step (d) further comprises:
determining if a number of empty leaf queues identified in the selected segment queue is less than a predetermined number;
when the number of empty leaf queues identified in the selected segment queue is not less than the predetermined number, appending entries in the selected segment queue to the update queue as a segment; and
when the number of empty leaf queues identified in the selected segment queue is less than the predetermined number, activating the empty leaf queues as the selected cell is queued in the selected root queue.

14. The method of claim 11, wherein queuing the cells in the plurality of root queues further comprises for each cell:
retrieving an available cell buffer from a free list, wherein each root queue of the plurality of root queues has a corresponding free list;
storing the cell in the available cell buffer; and
updating the free list to reflect usage of the available cell buffer.

15. The method of claim 11 further comprises:
providing the selected cell to one of the leaf queues corresponding to the selected multicast transmission;
decrementing a copy count corresponding to the selected cell as stored in the selected root queue;
updating the leaf head pointer of the one of the leaf queues corresponding to the selected multicast transmission; and
when the copy count equals a terminal count:
dequeuing the selected cell from the selected root queue; and
updating a head pointer of the root queue.

16. The method of claim 11 further comprises, when a new egress connection is added to the selected multicast transmission:
when the selected segment queue is non-empty, appending identity of a leaf queue associated with the new egress connection to the selected segment queue;
when the selected segment queue is empty, activating the selected segment queue via an active indicator and appending identity of a leaf queue associated with the new egress connection to the selected segment queue; and
incrementing fan out associated with the corresponding root queue.

17. The method of claim 11 further comprises, when an egress connection of the plurality of egress connections is being deleted from the selected multicast transmission:
flagging a current tail pointer of the selected root queue;
comparing the head pointer of the leaf queue corresponding to the egress connection being deleted with the current tail pointer of the selected root queue;
when the head pointer of the leaf queue corresponding to the egress connection being deleted matches the current tail pointer of the selected root queue and a cell in the cell buffer corresponding to the current tail pointer has been processed by the leaf queue corresponding to the egress connection being deleted, deleting the egress connection; and decrementing fan out of the selected multicast transmission.

18. The method of claim 17 further comprises, when one of: the head pointer of the leaf queue corresponding to the egress connection being deleted does not match the current tail pointer of the selected root queue, and when the head pointer of the leaf queue corresponding to the egress connection being deleted matches the current tail pointer of the selected root queue and the cell in the cell buffer corresponding to the current tail pointer has not been processed by the leaf queue corresponding to the egress connection being deleted:

setting a delete active indication;

copying the current tail pointer to a terminal cell buffer identifier; and providing cells from the selected root queue to the egress connection being deleted until the terminal cell buffer identifier is reached and a final cell corresponding to the terminal cell buffer identifier is provided to the egress connection being deleted.

19. The method of claim 11, wherein at least one of the plurality of egress connections of at least one of the plurality of multicast transmissions is a test access connection (TAC) that provides cells to a destination end system (DES).

20. A queue management module comprises:

a processing module; and memory operably coupled to the processing module, wherein the memory includes operational instructions that cause the processing module to:

queue a cell that is received in a next available cell buffer of a root queue associated with a multicast transmission;

determine whether a predetermined number of leaf queues of a plurality of leaf queues associated with the multicast transmission are empty when the queuing of the cell commences;

when there are at least the predetermined number of the leaf queues that are empty when the queuing of the cell commences, queue the leaf queues that are empty into an update queue; and update at least some of the leaf queues that are empty with a head pointer corresponding to the cell in the root queue, wherein the updating is performed based on dequeuing of the leaf queues from the update queue subsequent to the queuing of the cell.

21. The queue management module of claim 20, wherein the memory further comprises operational instructions that cause the processing module to perform the queuing of the leaf queues that are empty into the update queue by appending a segment to the update queue, wherein the segment is generated in a segment queue that stores identity of empty leaf queues, wherein the update queue is associated with a plurality of multicast transmissions.

22. The queue management module of claim 20, wherein the memory further comprises operational instructions that cause the processing module to, when there are less than the predetermined number of leaf queues that are empty when the queuing of the cell commences, update the leaf queues that are empty during queuing of the cell.

23. The queue management module of claim 20, wherein the memory further comprises operational instructions that cause the processing module to update a leaf queue such that updating includes updating leaf queue context information that includes a leaf head pointer and a leaf queue empty indicator.

24. The queue management module of claim 20, wherein the memory further comprises operational instructions that cause the processing module to update the at least some of the leaf queues that are empty during a root queue service vacancy interval.

25. The queue management module of claim 20, wherein the memory further comprises operational instructions that cause the processing module to:

retrieve the next available cell buffer from a free list, wherein the free list stores available cell buffers; and update the free list to reflect usage of the next available cell buffer.

26. The queue management module of claim 20, wherein the memory further comprises operational instructions that cause the processing module to queue the cell into the next available cell buffer such that queuing the cell includes updating cell buffer context information that includes a next cell pointer and a copy count, wherein the copy count identifies a number of destinations that have yet to read the cell from a corresponding cell buffer of the root queue.

27. The queue management module of claim 26, wherein the memory further comprises operational instructions that cause the processing module to:

provide the cell from the root queue to an egress connection associated with a selected leaf queue of the leaf queues;

decrement the copy count;

update a head pointer of the selected leaf queue; and when the copy count reaches a terminal count value, dequeue the cell from the root queue.

28. The queue management module of claim 27, wherein the memory further comprises operational instructions that cause the processing module to update the head pointer of the selected leaf queue such that updating the head pointer includes:

determining if the head pointer of the selected leaf queue indicates, based on present state of the root queue, that the selected leaf queue is empty; and when the selected leaf queue is empty, adding identity of the selected leaf queue to the segment queue.

29. A queue management module comprises:

a processing module; and memory operably coupled to the processing module, wherein the memory includes operational instructions that cause the processing module to perform the functions of:

(a) queuing cells received via ingress connections corresponding to a plurality of multicast transmissions in a plurality of root queues, wherein each of the plurality of multicast transmissions includes an ingress connection and a plurality of egress connections, wherein each of the plurality of root queues is associated with a corresponding one of the plurality of multicast transmissions;

(b) when a selected cell of the cells is queued in a selected root queue of the plurality of root queues corresponding to a selected multicast transmission of the plurality of multicast transmissions, determining whether a selected segment queue of a plurality of segment queues is non-empty, wherein each of the plurality of segment queues is associated with a corresponding one of the plurality of multicast transmissions, wherein the selected segment queue corresponds to the selected multicast transmission, wherein the selected segment queue stores indications of empty leaf queues corresponding to the selected multicast transmission, wherein leaf queues corresponding to the selected multicast transmission control transmission of cells on egress connections for the selected multicast transmission; and (c) when the selected segment queue is non-empty, appending entries in the selected segment queue to an update queue as a segment, wherein the update queue is used to activate the empty leaf queues, wherein activating the empty leaf queues includes updating a leaf head pointer in each of the empty leaf queues to reflect presence of the selected cell in the selected root queue.

30. The queue management module of claim 29, wherein the memory further comprises operational instructions that cause the processing module to perform the functions of:

determining when a leaf queue of the plurality of leaf queues is empty; and when the leaf queue is empty, adding identify of the leaf queue to a corresponding one of the segment queues.

31. The queue management module of claim 29, wherein the memory further comprises operational instructions that cause the processing module to perform function (c) such that function (c) further comprises:

determining if a number of empty leaf queues identified in the selected segment queue is less than a predetermined number;

when the number of empty leaf queues identified in the selected segment queue is not less than the predetermined number, appending entries in the selected segment queue to the update queue as a segment; and when the number of empty leaf queues identified in the selected segment queue is less than the predetermined number, activating the empty leaf queues as the selected cell is queued in the selected root queue.

32. The queue management module of claim 29, wherein the memory further comprises operational instructions that cause the processing module to perform the function of queuing the cells in the plurality of root queues such that queuing the cells further comprises, for each cell:

retrieving an available cell buffer from a free list, wherein each root queue of the plurality of root queues has a corresponding free list;

storing the cell in the available cell buffer; and updating the free list to reflect usage of the available cell buffer.

33. The queue management module of claim 29, wherein the memory further comprises operational instructions that cause the processing module to perform the functions of:

providing the selected cell to one of the leaf queues corresponding to the selected multicast transmission;

decrementing a copy count corresponding to the selected cell as stored in the selected root queue;

updating the leaf head pointer of the one of the leaf queues corresponding to the selected multicast transmission; and when the copy count equals a terminal count:
dequeuing the selected cell from the selected root queue; and
updating a head pointer of the root queue.

34. The queue management module of claim 29, wherein the memory further comprises operational instructions that cause the processing module to perform the functions of:

when a new egress connection is added to the selected multicast transmission:
when the selected segment queue is non-empty, appending identity of a leaf queue associated with the new egress connection to the selected segment queue;
when the selected segment queue is empty, activating the selected segment queue via an active indicator and appending identity of a leaf queue associated with the new egress connection to the selected segment queue; and
incrementing fan out associated with the corresponding root queue.

35. The queue management module of claim 29, wherein the memory further comprises operational instructions that cause the processing module to perform the functions of:

when an egress connection of the plurality of egress connections is being deleted from the selected multicast transmission:
flagging a current tail pointer of the selected root queue;
comparing the head pointer of the leaf queue corresponding to the egress connection being deleted with the current tail pointer of the selected root queue;
when the head pointer of the leaf queue corresponding to the egress connection being deleted matches the current tail pointer of the selected root queue and a cell in the cell buffer corresponding to the current tail pointer has been processed by the leaf queue corresponding to the egress connection being deleted, deleting the egress connection; and
decrementing fan out of the selected multicast transmission.

36. The queue management module of claim 35, wherein the memory further comprises operational instructions that cause the processing module to perform the functions of:

when one of: the head pointer of the leaf queue corresponding to the egress connection being deleted does not match the current tail pointer of the selected root queue, and when the head pointer of the leaf queue corresponding to the egress connection being deleted matches the current tail pointer of the selected root queue and the cell in the cell buffer corresponding to the current tail pointer has not been processed by the leaf queue corresponding to the egress connection being deleted:
setting a delete active indication;
copying the current tail pointer to a terminal cell buffer identifier; and
providing cells from the selected root queue to the egress connection being deleted until the terminal cell buffer identifier is reached and a final cell corresponding to the terminal cell buffer identifier is provided to the egress connection being deleted.

37. A method for cell buffering in a logical multicast transmission, comprising:

storing received cells for the logical multicast transmission in a root queue corresponding to the logical multicast transmission, wherein the logical multicast transmission includes a plurality of virtual connections corresponding to a plurality of destinations, wherein more than one of the plurality of virtual connections are supported by a single port within a source; and dequeuing cells from the root queue to each of the plurality of virtual connections using a plurality of leaf queues, wherein each of the plurality of leaf queues corresponds to one of the plurality of virtual connections, wherein, when non-empty, each leaf queue stores a pointer to a cell buffer in the root queue corresponding to a next cell to be transmitted by the virtual connection corresponding to the leaf queue.

38. The method of claim 37 further comprises:

when a leaf queue has transmitted all cells currently stored in the root queue, queuing identity of the leaf queue in a segment queue;

when additional cells are received and queued in the root queue, appending identities of leaf queues stored in the segment queue into an update queue as a segment; and activating each of the leaf queues included in the update queue such that the additional cells are dequeued using the leaf queues which are activated.

* * * * *